United States Patent
Ito et al.

(10) Patent No.: US 7,042,831 B2
(45) Date of Patent: May 9, 2006

(54) OPTICAL INFORMATION RECORDING MEDIUM

(75) Inventors: Kazunori Ito, Yokohama (JP); Hajime Yuzurihara, Odawara (JP); Nobuaki Onagi, Yokohama (JP); Katsuyuki Yamada, Zama (JP); Shinya Narumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 44 days.

(21) Appl. No.: 10/820,321

(22) Filed: Apr. 8, 2004

(65) Prior Publication Data

US 2004/0190436 A1 Sep. 30, 2004

Related U.S. Application Data

(63) Continuation of application No. 10/071,068, filed on Feb. 7, 2002, now Pat. No. 6,827,999.

(30) Foreign Application Priority Data

Feb. 9, 2001 (JP) ............................. 2001-034734

(51) Int. Cl.
*G11B 7/24* (2006.01)
*B32B 3/02* (2006.01)

(52) U.S. Cl. .................. 369/275.1; 369/283; 369/288; 428/64.4

(58) Field of Classification Search ............ 369/275.1, 369/275.3, 275.4, 283, 288, 277, 278, 275.5; 428/64.1, 64.4, 64.5, 64.6, 694 ML
See application file for complete search history.

(56) References Cited

U.S. PATENT DOCUMENTS

| | | |
|---|---|---|
| 5,011,723 A | 4/1991 | Harigaya et al. |
| 5,024,927 A | 6/1991 | Yamada et al. |
| 5,080,947 A | 1/1992 | Yamada et al. |
| 5,100,700 A | 3/1992 | Ide et al. |
| 5,736,657 A | 4/1998 | Ide et al. |
| 5,785,828 A | 7/1998 | Yamada et al. |
| 5,974,025 A | 10/1999 | Yamada et al. |
| 6,011,757 A | 1/2000 | Ovshinsky |
| 6,096,398 A | 8/2000 | Yuzurihara et al. |
| 6,127,016 A | 10/2000 | Hayashi et al. |

(Continued)

FOREIGN PATENT DOCUMENTS

EP 0 867 868 A 9/1998

(Continued)

OTHER PUBLICATIONS

U.S. Appl. No. 09/585,380, filed Jun. 1, 2000, claims & drawings.

(Continued)

*Primary Examiner*—Ali Neyzari
(74) *Attorney, Agent, or Firm*—Cooper & Dunham LLP

(57) ABSTRACT

A phase-change optical information recording medium in which information can be recorded, reproduced and rewritten and which includes a first transparent substrate having a wobbling guide groove which is spirally formed thereon at a pitch; a first dielectric layer located overlying the first transparent substrate and having an optical thickness of from 80 nm to 200 nm; a phase-change recording layer located overlying the first dielectric layer and having an optical thickness of from 20 to 50 nm when the recording layer is in an erased state; a second dielectric layer located overlying the recording layer and having an optical thickness of from 10 nm to 70 nm; a reflection layer located overlying the second dielectric layer; optionally a third dielectric layer located between the second dielectric layer and the reflection layer; and a second transparent substrate located overlying the reflection layer.

21 Claims, 4 Drawing Sheets

U.S. PATENT DOCUMENTS

| | | |
|---|---|---|
| 6,177,167 B1 | 1/2001 | Yazurihara et al. |
| 6,261,661 B1 | 7/2001 | Ohno |
| 6,280,684 B1 | 8/2001 | Yamada et al. |
| 6,319,368 B1 | 11/2001 | Ide et al. |
| 6,373,802 B1 | 4/2002 | Hattori et al. |
| 6,391,417 B1 | 5/2002 | Yuzurihara et al. |
| 6,426,936 B1 | 7/2002 | Shinotsuka et al. |
| 6,445,669 B1 | 9/2002 | Hattori et al. |
| 6,469,977 B1 | 10/2002 | Kitaura et al. |
| 6,479,121 B1 | 11/2002 | Miura et al. |
| 6,503,592 B1 | 1/2003 | Yamada et al. |
| 6,548,137 B1 | 4/2003 | Ito et al. |
| 6,652,806 B1 | 11/2003 | Ide et al. |
| 6,714,508 B1 * | 3/2004 | Spruit et al. ............ 369/275.4 |
| 2001/0028938 A1 | 10/2001 | Kojima |
| 2001/0036528 A1 | 11/2001 | Abiko |
| 2001/0041240 A1 | 11/2001 | Ito et al. |
| 2003/0003260 A1 | 1/2003 | Inoue et al. |
| 2003/0058763 A1 | 3/2003 | Noda |

FOREIGN PATENT DOCUMENTS

| | | |
|---|---|---|
| EP | 0 898 272 A | 2/1999 |
| EP | 1 065 659 A | 1/2001 |
| JP | 2652443 | 5/1997 |

OTHER PUBLICATIONS

U.S. Appl. No. 09/569,501, filed May 11, 2000, claims & drawings.

U.S. Appl. No. 09/534,183, filed Mar. 24, 2000, claims & drawings.

Communication pursuant to Article 96(2) EPC dated Sep. 30, 2005 in European Patent Application No. 02 250 766.9-2210, Ricoh Company, Ltd.

* cited by examiner

US 7,042,831 B2

OPTICAL INFORMATION RECORDING MEDIUM

This application is a continuation of U.S. patent application Ser. No. 10/071,068, filed Feb. 7, 2002 now U.S. Pat. No. 6,827,999.

BACKGROUND OF THE INVENTION

1. Field of the Invention

The present invention relates to an optical information recording medium, and more particularly to a phase-change optical information recording medium in which information is recorded, reproduced and rewritten by changing an optical property of a material in the phase-change recording layer thereof by irradiating the recording layer with a light beam.

2. Discussion of the Related Art

Japanese Patent No. 02652443 (i.e., Japanese Laid-Open Patent Publication No. 1-220126, hereinafter JP'443) discloses a method for recording information, such as address information for EFM signals with respect to CD-RW, in an information carrier 11 as shown in FIG. 6A. In addition, JP'443 discloses a method in which a wobbling groove is used to input address information with respect to DVD. FIGS. 6C and 6D are enlarged views of a portion 12 of the information carrier 11 shown in FIG. 6A, and FIG. 6B is a cross-section of the information carrier 11 when the carrier is cut at a line b—b shown in FIG. 6A. As shown in FIG. 6B, the information carrier 11 has a sinusoidally wobbling servo track 14. In FIG. 6B, numerals 15, 16 and 17 denote a transparent substrate, a recording layer and a protective layer, respectively. It is described in JP'443 that the servo track 14 has a frequency component which is produced by track modulation and which has an average frequency of 22.05 KHz, and that the frequency of the track modulation is modulated according to position information signals. However, in formation to be input in the information carrier has to satisfy the respective specified conditions for each application, and therefore when a disk is manufactured, the groove and recording layer have to be optimized so as to be suited for the application. The recording medium of the present invention satisfies the disk standards of 4.7 GB DVD+RW. An optical information recording medium satisfying the standards has not yet been disclosed.

Recently, rewritable optical disks which have the same capacity as high density DVD-ROMs and in which information can be recorded at the same speed as that for high density DVD-ROMs. These rewritable optical disks typically have a wobbling guide groove in their substrate to read and write information therein, and information such as clock information and address information of signals is input in the guide groove.

Because of these reasons, a need exists for a rewritable optical information recording medium which has the same capacity as high density DVD-ROMs and good recording properties even when information is recorded at a high speed.

SUMMARY OF THE INVENTION

Accordingly, an object of the present invention is to provide a rewritable optical information recording medium which has the same capacity as high density DVD-ROMs and good recording properties even when information is recorded at a high speed.

To achieve such an object, the present invention contemplates the provision of a phase-change optical information recording medium in which information is recorded, reproduced and rewritten by changing an optical property of a material in the phase-change recording layer thereof by irradiating the recording layer with a light beam and which includes a first transparent substrate (such as polycarbonate plates) having a wobbling groove which is spirally formed thereon at a pitch; a first dielectric layer located overlying the first transparent substrate and having an optical thickness nd (i.e., refractive index (n)× thickness (d)) of from 80 nm to 200 nm; a phase-change recording layer located overlying the first dielectric layer and having an optical thickness of from 20 nm to 50 nm (preferably 30 nm to 50 nm) when the recording layer is in an erased state; a second dielectric layer located overlying the recording layer and having an optical thickness of from 10 nm to 70 nm; a reflection layer including a metal; and a second transparent substrate (such as polycarbonate plates) located overlying the reflection layer.

The first and second transparent substrates preferably have the same thickness.

A third dielectric layer may be formed between the second dielectric layer and the reflection layer. A weather resistance layer may be formed between the reflection layer and the second transparent substrate. In addition, an adhesive layer may be formed between the second transparent substrate and the reflection layer (or the weather resistance layer).

The refractive index (n) and thickness (d) of the first transparent substrate having a wobbling groove are preferably from 1.50 to 1.65 and from 0.59 mm to 0.62 mm, respectively.

In addition the first transparent substrate preferably has an absolute value of birefringence not greater than 50 nm.

The pitch of the wobbling groove is preferably from 0.70 µm to 0.80 µm. It is preferable that the wobbling groove has an amplitude of from 15 nm to 40 nm and clock information is input in the wobbling groove using a first sinusoidal wobble having a first phase and address information and disk information are input in the wobbling groove using a second sinusoidal wobble having a phase different from the first phase by 1800°.

It is preferable that the wobbling period, depth and width of the wobbling groove is from 0.40 µm to 0.45 µm, from 22 nm to 40 nm and from 0.17 µm to 0.30 µm, respectively.

It is preferable that recording marks are recorded in the groove, wherein the width of the recording marks is from 0.9 to 1.5 times the width of the wobbling groove.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Figure 1:
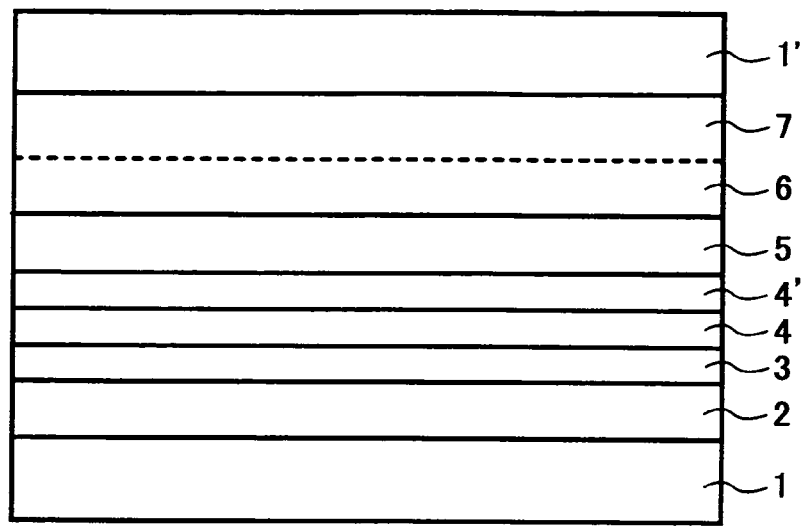
FIG. 1 is a schematic view illustrating the sectional view of an embodiment of the optical information recording medium of the present invention.

In the phase-change optical information recording medium of the present invention (hereinafter sometimes referred to as a recording medium), the signals recorded as recording marks in the phase-change recording layer (hereinafter sometimes referred to as the recording layer) have good signal characteristics, and the wobble information input in the guide groove formed on the substrate can be read at a low error rate. This is because the recording layer and the substrate have specified optical characteristics and the guide groove has a specified shape. Therefore the recording medium of the present invention can be used as a rewritable optical disk in which information recorded therein can be well reproduced by conventional DVD-ROM drives.

In order to provide such a recording medium, the following factors are important:

(1) optical thickness (nd) of each layer (i.e., the product of refractive index (n) of each layer and thickness (d) of the layer);

(2) refractive index and birefringence (absolute value) of the substrate; and (3) wobble form of the guide groove formed in the substrate.

The present inventors have investigated to develop a 4.7 GB DVD+RW which has the same capacity as DVD-ROMs which have been developed to be commercialized. As a result thereof, it is found that a recording medium in which wobble information input in the guide groove can be read at a low error rate and signals recorded as recording marks can be reproduced at a low error rate when the optical characteristics of the substrate and recording layer thereof and the shape of the guide groove formed on the substrate satisfy the conditions mentioned below. Thus, a rewritable optical disk having high reproduction compatibility can be provided.

The conditions are as follows:

(1) In a phase-change optical information recording medium in which information is recorded, reproduced and rewritten by changing an optical property of a material in the recording layer thereof by irradiating the recording layer with a light beam, a first dielectric layer having an optical thickness nd of from 80 nm to 200 nm; a phase-change recording layer having an optical thickness of from 20 nm to 50 nm when the recording layer is in an erased state; a second dielectric layer having an optical thickness of from 10 nm to 70 nm; a reflection layer including a metal, are formed on a first transparent substrate such as polycarbonate plates having a wobbling groove in this order by sputtering;

(2) the refractive index (n) and thickness (d) of the first transparent substrate having a wobbling groove are preferably from 1.5 to 1.65 and from 0.59 mm to 0.62 mm, respectively;

(3) the first transparent substrate preferably has an absolute value of birefringence not greater than 50 nm;

(4) the pitch of the wobbled groove is preferably from 0.70 μm to 0.80 μm and clock information is input in the wobbling groove using a first sinusoidal wobble having a first phase and address information and disk information are input in the wobbling groove using a second sinusoidal wobble whose phase is different from the first phase by 180°, while the amplitude of the wobbling groove is set so as to be from 15 nm to 40 nm;

(5) the wobbling period the wobbled groove is preferably from 0.40 μm to 0.45 μm;

(6) the depth of the wobbling groove is preferably from 22 nm to 40 nm;

(7) the width of wobbling groove is preferably from 0.17 μm to 0.30 μm; and (8) the width of a recording mark recorded in the groove is from 0.9 to 1.5 times the width of the wobbling groove.

Then the present invention will be explained referring to figures.

FIG. 1 is a schematic view illustrating the cross section of an embodiment of the recording medium of the present invention. On a polycarbonate substrate 1 having a guide groove, a first dielectric layer 2 serving as a lower protective layer; a recording layer 3; a second dielectric layer 4 and a third dielectric layer 4', which serve as an upper protective layer; and a reflection layer 5 serving as a radiator, are overlaid by sputtering. Numeral 1' denotes a second substrate which is formed on the reflection layer 5 optionally with an adhesive layer 7 therebetween. As the adhesive layer 7, adhesive sheets, ultraviolet crosslinking resins which can be radically crosslinked by ultraviolet rays, polymers made by a cationic polymerization method and the like can be preferably used. In addition, a weather resistance layer 6, which typically includes an ultraviolet crosslinking resin and which prevents the reflection layer from being corroded, is optionally formed by a spin coating method between the reflection layer 5 and the adhesive layer 7.

Typical sputtering conditions are as follows:

(1) first and second dielectric layers electric power applied to the sputtering device: 3 kW pressure of Ar gas in film forming room: 2 mTorr (2) recording layer electric power applied to the sputtering device: 1 kW pressure of Ar gas in film forming room: 2 mTorr (3) third dielectric layer electric power applied to the sputtering device: 1 kW pressure of Ar gas in film forming room: 2 mTorr (4) reflection layer electric power applied to the sputtering device: 9 kW pressure of Ar gas in film forming room: 2 mTorr The sputtering conditions are not limited thereto.

The first, second and third dielectric layers, recording layer and reflection layer can be formed by known vapor-phase growth methods such as vacuum deposition methods, sputtering methods and deposition methods using electron beams.

Having generally described this invention, further understanding can be obtained by reference to certain specific examples which are provided herein for the purpose of illustration only and are not intended to be limiting.

EXAMPLES

Example 1

On a polycarbonate substrate having a wobbling groove having a pitch of 0.74 μm, an amplitude of 35 nm and a width of 0.25 μm, the following first dielectric layer, recording layer, second dielectric layer, third dielectric layer and a reflection layer were formed in this order by sputtering.

(1) first dielectric layer
  target used: $ZnS/SiO_2$ (80/20 by mole ratio)
  thickness of the formed layer: 65 nm to 85 nm
(2) recording layer
  target used: Ag/In/Sb/Te/Ge (0.5/5/64/25/2 by atomic percent)
  thickness of the formed layer: 15 nm to 20 nm
(3) second dielectric layer
  target used: $ZnS/SiO_2$ (80/20 by mole ratio)
  thickness of the formed layer: 12 nm
(4) third dielectric layer
  target used: $SiC/SiO_2$ (50/50 by mole ratio)
  thickness of the formed layer: 2 nm to 8 nm
(5) reflection layer
  target used: Ag
  thickness of the formed layer: 80 nm to 150 nm Thus, a phase-change optical information recording medium of the present invention was prepared.

The refractive index of the first and second dielectric layers was 2.0, the refractive index of the blank recording layer was 2.3 and the refractive index of the third dielectric layer was 2.5. The optical thickness of the recording medium is shown in Table 1.

The thus prepared recording medium was evaluated with respect to reflection, modulation rate and jitter. The results are shown in Table 2.

In order to prepare a phase-change rewritable optical disk having good compatibility, the optical disk has to satisfy the standards of double-layer DVD-ROM disks, and it is known that the optical disk is needed to satisfy the following conditions:
  Reflection: 18 to 30%;
  Modulation rate: greater than 0.60; and
  Jitter: less than 9%.

The standard of jitter of DVD-ROMs is less than 8%. However, it is known for DVD-ROMs that when the pickup has a tilt of ±0.75 degrees, the error rate is little when the jitter is not greater than 15%. In the phase-change optical information recording media, such specifications (i.e., jitter not greater than 15%) of DVD-ROMs can be fulfilled if the minimum jitter is not greater than 9%.

In order to develop a rewritable optical disk in which signals obtained by the marks recorded in the recording layer have good signal characteristics and from which wobble information input in the guide groove can be read at a low error rate, the present inventors have investigated in detail the optical properties required for the optical disk. As a result, it is found that the requisites for the optical disk satisfying the DVD+RW standards are the following.

With respect to the recording layer, a recording layer in which Ge is added to a AgInSbTe material, which is typically used for CD-RWs, in an amount of from 1 to 5 atomic % is used. In this case, when the optical thickness nd is from 20 nm to 50 nm, and preferably from 30 nm to 50 nm, the resultant recording layer has good optical properties. Specifically, when the recording layer includes Ag, In, Sb, Te and Ge in an amount of about 0.5 atomic %, about 5 atomic %, about 64 atomic %, about 25 atomic % and 2 atomic %, respectively, the resultant disk (blank disk) has a refractive index of about 2.3. In this case, the thickness Dpc of the phase-change recording layer is preferably from 9 nm to 23 nm, and more preferably from 13 to 19 nm.

The first dielectric layer is formed using a mixture target of ZnS and $SiO_2$. The content of $SiO_2$ is preferably not greater than 50%. The optical thickness nd of the first dielectric layer is from 80 nm to 200 nm, and preferably from 120 nm to 180 nm. Specifically, when the first dielectric layer is formed by a RF (radio frequency) sputtering method under the following conditions:
  target used: $Zns-SiO_2$ (80/20 in mole %)
  electric power applied to the sputtering device: 3 kW
  Ar gas pressure in the filming room: 2 mTorr, the refractive index of the resultant dielectric layer is about 2.0. In this case, the thickness $Ddi_1$ of the first dielectric layer is preferably 40 nm to 100 nm, and more preferably from 70 nm to 90 nm.

When the content of $SiO_2$ is greater than 50%, the sputtering speed has to be decreased, resulting in deterioration of throughput when manufacturing the optical disk, and thereby the manufacturing cost of the optical disk is increased.

When the first dielectric layer ($ZnS/SiO_2$) has a small optical thickness, problems which occur are that reflection of the optical disk is out of the preferable range when recorded signals are reproduced, and recording properties deteriorate when the optical disk is repeatedly recorded. To the contrary, when the first dielectric layer has a large optical thickness, the reflection highly increases, resulting in decrease of real modulation rate, and thereby the error rate is increased when information is reproduced.

Similarly to the first dielectric layer, the second dielectric layer is formed using a mixture of ZnS with $SiO_2$. Since the refractive index of the dielectric layer formed by the sputtering method used for forming the first dielectric layer is about 2.0, the thickness $Ddi_2$ of the second dielectric layer is preferably from 5 nm to 35 nm, and more preferably from 10 nm to 20 nm.

If the third dielectric layer is not formed, the resultant optical disk can be used under practical usage conditions. However, by forming the third dielectric layer which includes a mixture of SiC with $SiO_2$ and which serves as an upper protective layer by being overlaid on the second dielectric layer, the resultant optical disk has better reliability. Namely, when the third dielectric layer is formed between the second dielectric layer and the reflection layer, the deterioration (such as sulfuration) of the material (such as Ag and Ag alloys) of the reflection layer due to the sulfide (ZnS) included in the second dielectric layer can be prevented. From this viewpoint, the main component of the third dielectric layer is preferably a dielectric material other than oxides, and therefore the content of oxides such as $SiO_2$ is preferably not greater than 50%.

When the third dielectric layer is formed, the thickness $Ddi_2$ of the second dielectric layer is preferably from 9 nm to 15 nm, and the thickness Ddi3 of the third dielectric layer is preferably from 2 nm to 8 nm. In this case, since the refractive index of the third dielectric layer formed under the above-mentioned film forming conditions is about 2.5, the optical thickness nd of the combination of the second and third dielectric layers is from 23 nm to 70 nm, which is in the preferable range (i.e., 10 nm to 70 nm). When the thickness is too small, a problem in that contrast of recorded marks deteriorates occurs. To the contrary, when the thickness is too large, the recording properties deteriorate as the optical disk is repeatedly used.

In Example 1, silver (Ag) is used for the reflection layer. Although a layer formed of a material such as aluminum alloys and Au can also be used as the reflection layer, silver or a silver alloy with an element such as Pd, In, Cu, Si, Ge and Cr can be preferably used as the reflection layer. In addition, a mixture of silver with such an element can also be used if the mixture forms an eutectic alloy. The content of such an element is preferably not greater than 10%. These eutectic alloys can impart good recording characteristics to the optical medium. The thickness of the reflection layer is preferably from 60 nm to 200 nm. When the reflection layer is too thin, good radiation effect cannot be exerted. To the contrary, when the reflection layer is too thick, the reflection layer tends to be peeled from the third dielectric layer (or the second dielectric layer if the third dielectric layer is not formed). The optical conditions of the polycarbonate substrate are mentioned below.

Example 2

As a result of evaluation with respect to refractive index, thickness and absolute value of birefringence of the polycarbonate substrate used for the optical disk of Example 1 and having a wobbling groove, it is found that the refractive index is preferably from 1.50 to 1.65. When the refractive index is too high, the reflectance of the optical disk seriously decreases. In contrast, when the refractive index is too low, the reflectance of the optical disk seriously increases, resulting in deterioration of the modulation rate.

The absolute value of birefringence of the substrate is preferably not greater than 50 nm. When the absolute value of birefringence is too high, the reflectance of the optical disk seriously decreases. In addition, when the absolute value of birefringence of an optical disk varies in the radial direction of the optical disk, the reflectance also varies in the radial direction. Therefore, it is preferable that the absolute value of birefringence is as small as possible.

The thickness of the substrate is preferably from 0.59 mm to 0.62 mm. When the substrate is too thin, the revolution of the disk becomes unstable when information is reproduced by a reproduction device because the disk cannot be securely cramped by the device. When the substrate is too thin or too thick, the resultant optical disk cannot be well focused by the pickup used. In addition, it is found that when the thickness varies in the radial direction of an optical disk such that the thickness is out of the above-mentioned range, a problem such that the signal strength varies in the radial direction thereof occurs.

As mentioned above, by optimizing the optical thicknesses of the first, second and third dielectric layers and the substrate, for example, an optical disk in which information can be recorded at a high linear speed 2.5 times that of DVD-ROMs and which has good overwrite properties can be provided. In addition, by optimizing the optical thicknesses and optimizing the groove conditions which are mentioned below, an optical disk in which clock information and address information input in the wobbling groove can be read at a low error rate can be provided.

Example 3

In DVD+RW media, clock information is input using a first sinusoidal wobble having a first phase, and address and disk information is input therein using a second sinusoidal wobble whose phase is different from the first phase by 180°.

The amplitude of the carrier noise of the wobble information read from the wobbling groove is good when the amplitude of the wobbling groove is from 15 nm to 40 nm, and preferably from 20 nm to 40 nm. When the amplitude of the wobbling groove is too small, the quantity of the carrier seriously decreases, and thereby the error rate increases when reading the address information and medium information input in the groove.

In contrast, when the amplitude is too large, reading information from a groove is interfered by the adjacent groove, resulting in increase of noise, and thereby the error rate is seriously increased in the information reading process. In addition, when grooves are prepared by a stamper, the modulation device is highly loaded in the light irradiation process, and thereby the grooves cannot be stably formed on the entire surface of the medium.

Figure 2:
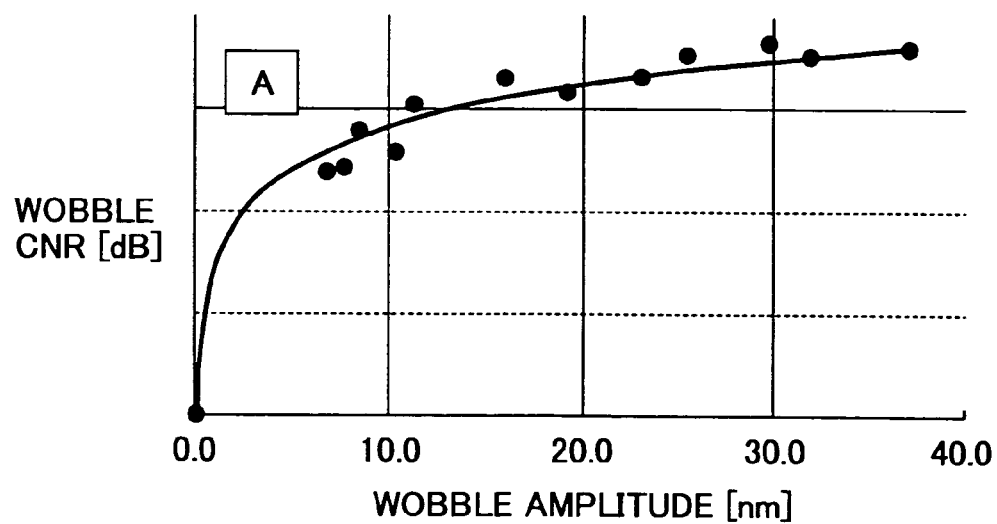
FIG. 2 is a graph illustrating the relationship between the wobbling amplitude and wobble CN ratio with respect to an embodiment of the optical information recording medium of the present invention.

The present inventors measure the wobble C/N (carrier/noise) ratio of the optical disk prepared in Example 2, which ratio is an alternative characteristic of the error rate when reading clock information and address information, while changing the amplitude and the wobble period of the wobbling groove. The results are shown in FIG. 2. In the area A, clock information and address information can be stably read. It can be understood from FIG. 2 that the C/N ratio falls in the area A if the wobble amplitude is about 15 nm. In order to securely obtain a C/N ratio in the area A, the wobble amplitude is preferably not less than 20 nm.

Figure 3:
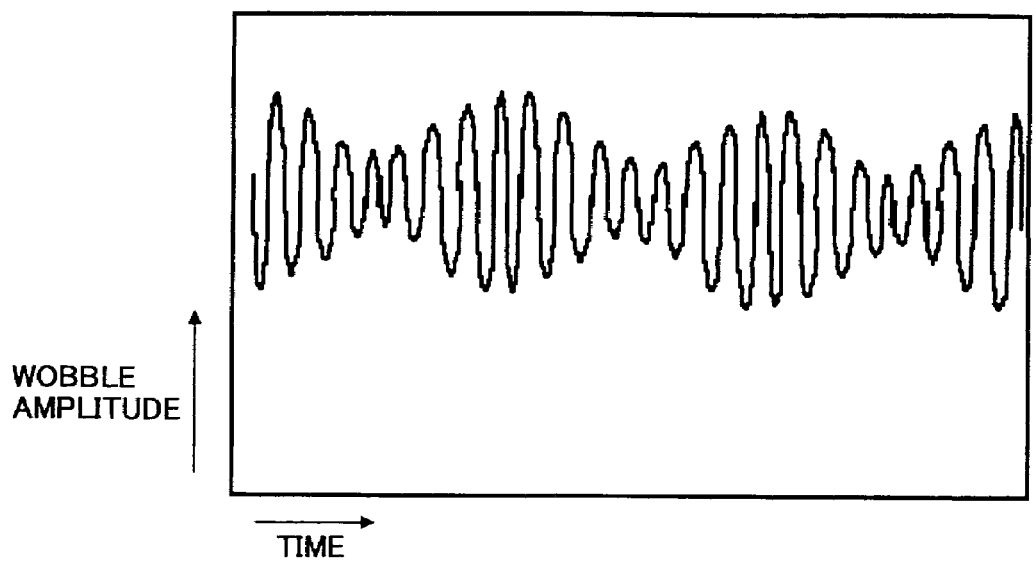
FIG. 3 is a schematic view illustrating the wobble signal wave (which has an inter-track interference) of an embodiment of the optical information recording medium of the present invention.
Figure 4:
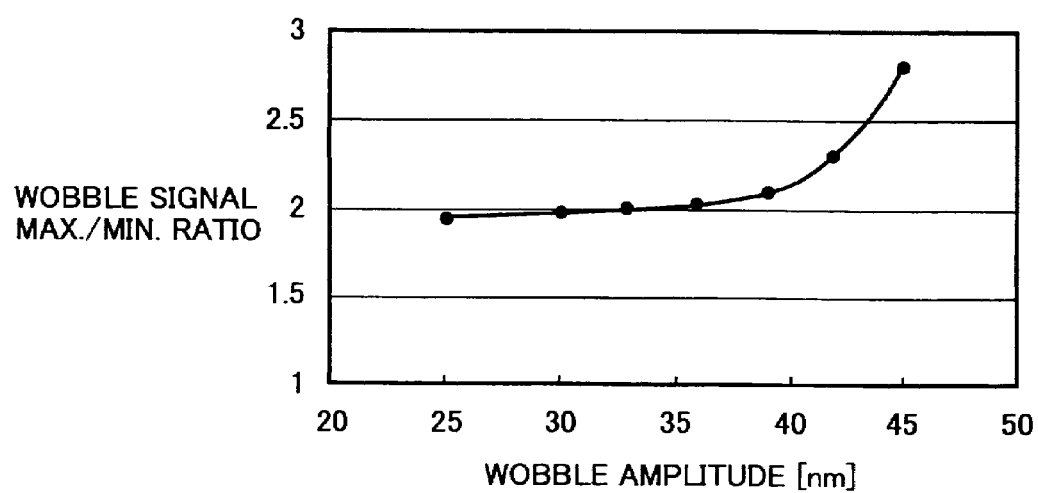
FIG. 4 is a graph illustrating the relationship between the wobbling amplitude and wobble signal max/min ratio with respect to an embodiment of the optical information recording medium of the present invention.

When the amplitude is further increased, the resultant waveform of the signals of the groove which are obtained by detecting the light reflected by the groove with plurally divided photo diodes is shown in FIG. 3. As can be understood from FIG. 3, the waveform is periodically strengthened and weakened due to the interference with the adjacent groove. The maximum/minimum ratio of the signal (Vwobble) is plotted in FIG. 4.

The present inventors evaluate the error rate when reading clock information and address information. As a result, it is found that the error rate increases if the maximum/minimum ratio of Vwobble is greater than 2.5. As can be understood from FIG. 4, at the point in which the maximum/minimum ratio of Vwobble is 2.5, the wobble amplitude is about 40 nm.

When the wobble period is changed, the frequency component is also changed. Therefore the CN ratio as shown in FIG. 2 decreases, and thereby address information cannot be stably obtained. As a result of the present inventors' experiment, the wobble period is preferably from 4.0 μm to 4.5 μm.

Example 4

The present inventors evaluate the reflectance, track cross signals after recording, push-pull signals and reading error rate of the address information with respect to the optical disk of Example 2 while changing the groove depth and width. The results are shown in Table 2.

As a result, the groove depth is preferably from 22 nm to 35 nm, and more preferably from 24 nm to 30 nm. When the depth is too small, the push-pull signals by which a recording device can identify the groove seriously decrease, and thereby stable servo properties cannot be obtained and tracking cannot be performed. To the contrary, when the depth is too large, the reflectance seriously decreases, and thereby information cannot be reproduced by DVD-ROM devices.

Decrease of the reflectance can be controlled by changing the thickness of the first dielectric layer but it deteriorates the recording characteristics.

The groove width is preferably from 0.17 μm to 0.30 μm, and more preferably from 0.20 μm to 0.28 μm. When the groove width is too small, the reflectance serious decreases. To the contrary, when the reflectance is too large, track cross signals seriously decrease and thereby a problem such that search cannot be well performed occurs.

Example 5

The present inventors evaluate the jitter, modulation rate and track cross signals after recording of the optical disk of Example 2 while changing the width of the record marks. As a result, it is found that good recording properties can be obtained when the record marks are recorded in the groove and the width of the record marks is from 0.9 to 1.5 times the width of the groove.

Figure 5:
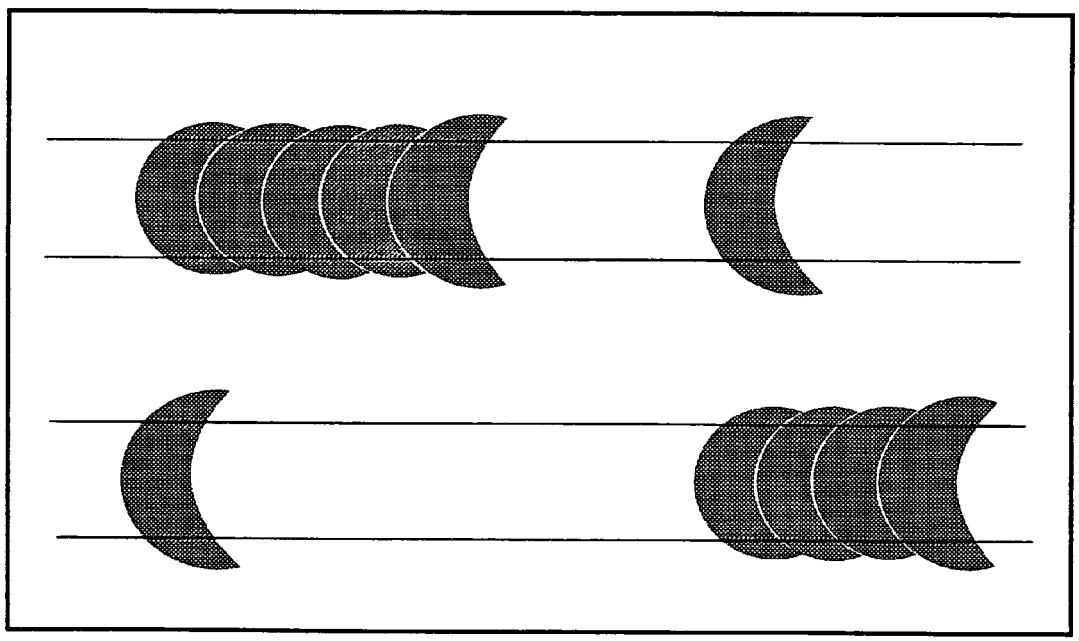
FIG. 5 is a schematic view illustrating recording marks formed along the groove of an embodiment of the optical information recording medium of the present invention.
Figure 6A:
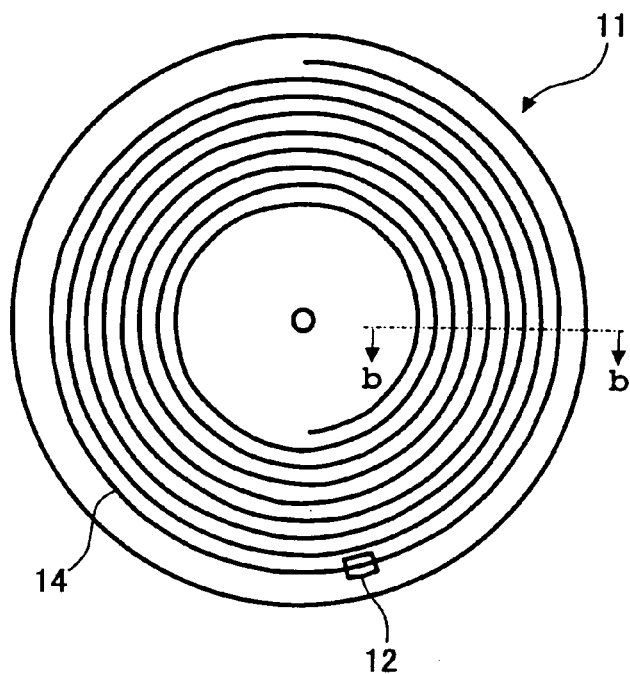
FIG. 6A is a plan view illustrating a background optical information recording medium.
Figure 6B:
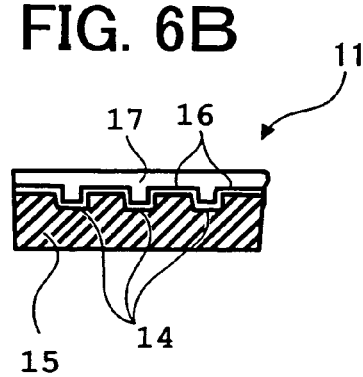
FIG. 6B is a schematic view illustrating the cross section of the background optical information recording medium.
Figure 6C:
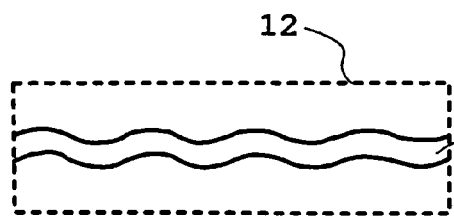
FIG. 6C is an enlarged plan view of an embodiment (sinusoidal track wobble) of the portion 2 (wobble) of the background optical information recording medium shown in FIG. 6A.
Figure 6D:
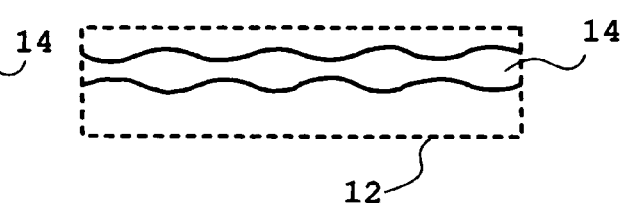
FIG. 6D is an enlarged plan view of another embodiment (track width modulation) of the portion 2 (wobble) of the background optical information recording medium shown in FIG. 6A.

This optical disk is suitable for high density recording, and when each layer of the optical disk has the above-mentioned preferable optical thickness, the resultant optical disk has a capacity of 4.7 giga byte (GB) if the optical disk has a groove having a track pitch of 0.74 μm. In the optical disk of the present invention, marks having a width wider than the groove width are formed while the groove is shallow. A typical form of the recording marks is shown in FIG. 5. Thus the modulation rate can be enhanced so as to be the same as that of DVD-ROMs. Therefore the resultant optical recording medium has good reproduction compatibility with DVD-ROMs.

When the record marks are too small, the modulation rate cannot be securely obtained and jitter deteriorates. To the contrary, when the record marks are too large, the track cross signals deteriorate, and thereby search cannot be well performed and jitter and overwrite characteristics are also deteriorated. In addition, a problem in that the data error rate seriously increases due to interference with the adjacent recording marks occurs.

Comparative Examples 1 to 6

The procedures for preparation and evaluation of the recording medium of Example 1 were repeated except that the optical thickness of the first and second dielectric layers and the recording layer was changed as shown in Table 1 so as to be out of the preferable range mentioned above.

The (optical) thickness of each layer of the optical disks of Examples 1 to 3 and Comparative Examples 1 to 6 are shown in Table 1, and the evaluation results are shown in Tables 2 and 3.

TABLE 1

| | Optical thickness nd (nm) | | | | Thickness of reflection layer (nm) |
|---|---|---|---|---|---|
| | First dielectric layer | Recording layer | Second dielectric layer | Third dielectric layer | |
| Ex. 1 | 150 | 46 | 24 | 12.5 | 140 |
| Ex. 2 | 160 | 36 | 22 | 7.5 | 140 |
| Ex. 3 | 120 | 48 | 20 | 7.5 | 140 |
| Comp. Ex. 1 | 78* | 46 | 20 | 7.5 | 140 |
| Comp. Ex. 2 | 205* | 35 | 25 | 7.5 | 140 |
| Comp. Ex. 3 | 150 | 53* | 20 | 7.5 | 140 |
| Comp. Ex. 4 | 150 | 18* | 20 | 7.5 | 140 |
| Comp. Ex. 5 | 150 | 45 | 8* | 7.5 | 140 |
| Comp. Ex. 6 | 150 | 45 | 75* | 7.5 | 140 |

Note: the thickness with star mark (*) is out of the preferable range.

TABLE 2

| | Jitter (%) | Modulation rate | Reflectance (%) | Overwriting ability (times) |
|---|---|---|---|---|
| Ex. 1 | 7.1 | 0.69 | 20 | 7000 |
| Ex. 2 | 7.0 | 0.67 | 21.5 | 10000 |
| Ex. 3 | 6.9 | 0.72 | 18.5 | 3000 |
| Comp. Ex. 1 | 7.0 | 0.72 | 17* | 800 |
| Comp. Ex. 2 | 8.0 | 0.58* | 23 | 8000 |
| Comp. Ex. 3 | 9.1* | 0.61 | 21 | —* (cannot be measured) |
| Comp. Ex. 4 | 6.8 | 0.59* | 18 | 500 |
| Comp. Ex. 5 | 10.5* | 0.58* | 19 | —* (cannot be measured) |
| Comp. Ex. 6 | 11* | 0.60 | 20 | —* (cannot be measured) |

Note:
(1) the data with star mark (*) are out of the range.
(2) Overwriting ability is defined as the number of overwriting times at a jitter not greater than 9%.

TABLE 3

| | Groove depth (nm) | Groove width (nm) | Reflectance (%) | Track cross signal | Push-pull signal | Address error rate |
|---|---|---|---|---|---|---|
| Ex. 1 | 27 | 0.25 | 21 | 0.16 | 0.40 | 0/1000 |
| Ex. 2 | 20* | 0.25 | 23 | 0.10* | 0.27* | 3/1000 |
| Ex. 3 | 42* | 0.25 | 16* | 0.19 | 0.54 | 5/1000 |
| Ex. 4 | 27 | 0.16* | 17* | —* (cannot be measured) | 0.25 | —* (cannot be measured) |
| Ex. 5 | 27 | 0.33* | 22 | 0.09* | 0.58 | 356/1000* |

Note: the data with star mark (*) are on the limit or out of the preferable range.

Effects of the Present Invention

As can be understood from the above-description, the optical information recording medium of the present invention includes at least a first dielectric layer, a phase-change recording layer, a second dielectric layer and a reflection layer, wherein each of the first and second dielectric layers and recording layer has a specified optical thickness, and therefore signals obtained from the record marks recorded in the phase-change recording layer have good characteristics while the wobble information input in the groove can be read at a low error rate. In addition, the optical information recording medium has a relatively high reflectance, and therefore the recording medium has good compatibility with DVD-ROM drives and players.

In addition, when the substrate of the optical information recording medium, which has the groove, has the specified refractive index, thickness and absolute value of birefringence mentioned above, information can be stably reproduced while the recording medium has good reproduction compatibility with DVD-ROM players.

Further, when the groove of the optical information recording medium has the specified pitch, wobble period, depth and width, the resultant recording medium has good signal characteristics and can be used as a rewritable optical disk while the wobble information input in the groove can be read at a low error rate.

Furthermore, when record marks are formed on the shallow groove while the width of the marks is wider than the width of the groove, the modulation rate can be enhanced, and thereby the resultant optical recording medium satisfies the DVD-ROM standards. Therefore the optical recording medium has good compatibility with DVD-ROM drivers and players.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2001-34734, filed on Feb. 9, 2001, the entire contents of which are herein incorporated by reference.

What is claimed is:

1. A phase-change optical information recording medium in which information can be recorded, reproduced and rewritten, comprising:
   a first transparent substrate having a wobbling groove which is spirally formed thereon at a pitch;
   a first dielectric layer located overlying the first transparent substrate and having an optical thickness of from 80 nm to 200 nm;
   a phase-change recording layer located overlying the first dielectric layer and having an optical thickness of from 20 nm to 50 nm when the phase-change recording layer is in an erased state;
   a second dielectric layer located overlying the phase-change recording layer and having an optical thickness of from 10 nm to 70 nm;
   a reflection layer located overlying the second dielectric layer; and
   a second transparent substrate located overlying the reflection layer,
   wherein a push-pull signal is from 0.27 to 0.54 after recording.

2. The optical information recording medium according to claim 1, further comprising a third dielectric layer between the second dielectric layer and the reflection layer.

3. The optical information recording medium according to claim 1, further comprising an adhesive layer between the reflection layer and the second transparent substrate.

4. The optical information recording medium according to claim 1, further comprising a weather resistance layer between the reflection layer and the second transparent substrate.

5. The optical information recording medium according to claim 1, wherein the first transparent substrate has a refractive index of from 1.50 to 1.65 and a thickness of from 0.59 mm to 0.62 mm.

6. The optical information recording medium according to claim 1, wherein the first transparent substrate has an absolute value of birefringence not greater than 50 nm.

7. The optical information recording medium according to claim 1, wherein the pitch of the wobbling groove is from 0.70 μm to 0.80 μm, and the wobbling groove has an amplitude of from 15 nm to 40 nm, and wherein clock information is input in the wobbling groove using a first sinusoidal wobble having a first phase and address information and disk information are input in the wobbling groove using a second sinusoidal wobble having a phase different from the first phase of the first sinusoidal wobble by 180°.

8. A phase-change optical information recording medium in which information can be recorded, reproduced and rewritten, comprising:
   a first transparent substrate having a wobbling groove which is spirally formed thereon at a pitch;
   a first dielectric layer located overlying the first transparent substrate and having an optical thickness of from 80 nm to 200 nm;
   a phase-change recording layer located overlying the first dielectric layer and having an optical thickness of from 20 nm to 50 nm when the phase-change recording layer is in an erased state;
   a second dielectric layer located overlying the phase-change recording layer and having an optical thickness of from 10 nm to 70 nm;
   a reflection layer located overlying the second dielectric layer; and
   a second transparent substrate located overlying the reflection layer,
   wherein a maximum/minimum ratio of Vwobble is not greater than 2.5.

9. The optical information recording medium according to claim 8, further comprising a third dielectric layer between the second dielectric layer and the reflection layer.

10. The optical information recording medium according to claim 8, further comprising an adhesive layer between the reflection layer and the second transparent substrate.

11. The optical information recording medium according to claim 8, further comprising a weather resistance layer between the reflection layer and the second transparent substrate.

12. The optical information recording medium according to claim 8, wherein the first transparent substrate has a refractive index of from 1.50 to 1.65 and a thickness of from 0.59 mm to 0.62 mm.

13. The optical information recording medium according to claim 8, wherein the first transparent substrate has an absolute value of birefringence not greater than 50 nm.

14. The optical information recording medium according to claim 8, wherein the pitch of the wobbling groove is from 0.70 μm to 0.80 μm, and the wobbling groove has an amplitude of from 15 nm to 40 nm, and wherein clock information is input in the wobbling groove using a first sinusoidal wobble having a first phase and address information and disk information are input in the wobbling groove using a second sinusoidal wobble having a phase different from the first phase of the first sinusoidal wobble by 180°.

15. A phase-change optical information recording medium in which information can be recorded, reproduced and rewritten, comprising:
   a first transparent substrate having a wobbling groove which is spirally formed thereon at a pitch;
   a first dielectric layer located overlying the first transparent substrate and having an optical thickness of from 80 nm to 200 nm;
   a phase-change recording layer located overlying the first dielectric layer and having an optical thickness of from 20 nm to 50 nm when the phasechange recording layer is in an erased state;
   a second dielectric layer located overlying the phase-change recording layer and hiving an optical thickness of from 10 nm to 70 nm;
   a reflection layer located overlying the second dielectric layer; and
   a second transparent substrate located overlying the reflection layer, wherein a wobbling amplitude is not greater than 40 nm and a maximum/minimum ratio of Vwobble is not greater than 2.5.

16. The optical information recording medium according to claim 15, further comprising a third dielectric layer between the second dielectric layer and the reflection layer.

17. The optical information recording medium according to claim 15, further comprising an adhesive layer between the reflection layer and the second transparent substrate.

18. The optical information recording medium according to claim 15, further comprising a weather resistance layer between the reflection layer and the second transparent substrate.

19. The optical information recording medium according to claim 15, wherein the first transparent substrate has a refractive index of from 1.50 to 1.65 and a thickness of from 0.59 mm to 0.62 mm.

20. The optical information recording medium according to claim 15, wherein the first transparent substrate has an absolute value of birefringence not greater than 50 nm.

21. The optical information recording medium according to claim 15, wherein the pitch of the wobbling groove is from 0.70 μm to 0.80 μm, and the wobbling groove has an amplitude of from 15 nm to 40 nm, and wherein clock information is input in the wobbling groove using a first sinusoidal wobble having a first phase and address information and disk information are input in the wobbling groove using a second sinusoidal wobble having a phase different from the first phase of the first sinusoidal wobble by 180°.

* * * * *